United States Patent [19]

Cox

[11] 4,113,288
[45] Sep. 12, 1978

[54] SWIVEL COUPLING
[75] Inventor: Donald E. Cox, Rolling Hills Estates, Calif.
[73] Assignee: Coxwells, Incorporated, Los Angeles, Calif.
[21] Appl. No.: 747,660
[22] Filed: Dec. 6, 1976
[51] Int. Cl.² ............................................. F16L 27/08
[52] U.S. Cl. ................................. 285/174; 285/276; 285/281
[58] Field of Search ................ 285/98, 174, 276, 281, 285/305, 351, 175, 321

[56] References Cited
U.S. PATENT DOCUMENTS

| | | | |
|---|---|---|---|
| 1,538,007 | 5/1925 | Schellin | 285/276 X |
| 2,338,716 | 1/1944 | Hardwick | 285/276 |

Primary Examiner—Werner H. Schroeder
Assistant Examiner—Conrad L. Berman
Attorney, Agent, or Firm—Nilsson, Robbins, Dalgarn, Berliner, Carson & Wurst

[57] ABSTRACT

A system is disclosed for dispensing fuel, e.g. gasoline, from a reservoir tank into a consumption tank as in an automobile. The system incorporates two fluid flow channels, first a channel for liquid fuel and second a return line for fluid vapors. The channels include flexible hoses extending from a pump to a dispensing nozzle with rotatable or swiveled couplings. The couplings include two mating members affixed together to provide a fluid seal and relative rotation to accommodate swivel movement. One coupling member includes a fastening section which may be threaded to affix the coupling to a rigid structure, e.g. pump or nozzle. Also, the one member includes a somewhat cylindrical section defining an external, concentric groove for receiving a ring of nylon-like material. The cylindrical section of the one member is telescopically received within the other member which defines an internal groove for locking engagement with the nylon-like ring. The second member further includes a plurality of O-rings to accomplish a fluid seal with the cylindrical section. A fastener structure is also incorporated in a second member for locking it to a flexible hose. The coupling member provides a uniform internal diameter to avoid any obstructions to fluid flow while accommodating swivel motion.

4 Claims, 3 Drawing Figures

SWIVEL COUPLING

BACKGROUND AND SUMMARY OF THE INVENTION

Traditionally, fuel, e.g. gasoline, has been dispensed into automobiles through a nozzle which is loosely inserted in a filling spout for the automobile fuel tank. It is inherent in such an arrangement that fumes from the automotive fuel tank, concentrated with live hydrocarbons, are dispersed into the atmosphere. Such an arrangement was tolerable at certain levels; however, the situation has long existed in which fumes discharged from automobile tanks during refueling are a significant pollutant to the atmosphere.

Contamination of the atmosphere by live hydrocarbons dispersed during refueling operations, as well as a saving of fuel, may be accomplished by transferring gaseous fumes from an automobile fuel tank to a source tank from which the fuel is drawn. That is, as the liquid fuel flows from the source tank into the automobile fuel tank, maintaining pressures involves venting gaseous fumes from the automobile tank to flow into the source tank. Consequently, a balance can be achieved with economy and avoidance of contamination by simply transferring the gaseous fumes from the automobile tank to replace the liquid fuel drawn from the reservoir tank. Of course, such transfer can be accomplished by a variety of techniques including pumps and return lines. However, the gaseous fumes are almost explosive in nature and, of course, are readily compressible in passages which resist free flow. In accordance with the present invention, it is proposed to afford an unobstructed flow passage for the gaseous fumes which is of substantially the same size as the liquid fuel passage and which is unobstructed by irregularities in the passage.

Generally, the provision of equal passages (one for liquid fuel and another for gaseous fumes) of similar size and containing no obstruction, does not present a great problem in view of existing technology. However, other requirements exist which render previously known structures somewhat inapplicable. Specifically, the arrangement of two hoses for dispensing fuel from a fuel pump is particularly troublesome unless the hoses are swivel connected to the rigid members, e.g. the pump and nozzle. Furthermore, in view of the vast number of filling stations which should be equipped with refueling apparatus as considered above, it is apparent that the aggregate cost may assume very large proportions. Consequently, it is important that the couplings involved be simple, economical, durable, and easy to install and assemble.

In general, the present invention relates to a refueling system which incorporates a coupling mechanism for affording a swivel connection between a flexible hose and a rigid member, e.g. a tank or nozzle. Additionally, the coupling provides a uniform passage for fluid flow and furthermore is swiveled to accommodate rotation between the hose and the rigid member. A coupling device incorporates a pair of rigid components, one of which is adapted to be connected to a rigid member while the other is adapted to be connected to a hose. The component connected to the rigid member incorporates a somewhat cylindrical section defining an external concentric, annular groove adjacent to an external cylindrical surface. The hose component telescopically receives the rigid member component in a somewhat cylindrical section defining an internal concentric, annular groove for alignment with the annular groove in the received component. A nylon-like member is then fitted in the aligned grooves to mechanically lock the two components together in rotatable relationship. The external component (hose member) also defines at least one groove for receiving an 0-ring, which O-ring dwells upon the external cylindrical portion of the received component to accomplish a rotatable fluid seal.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE ILLUSTRATIVE EMBODIMENT

As indicated above, a detailed illustrative embodiment of the invention is disclosed herein. However, embodiments may be constructed in accordance with various forms, some of which may be rather different from the disclosed illustrative embodiment herein. Consequently, the specific structural and functional details disclosed herein are merely representative, yet in that regard they are deemed to provide the best embodiment for purposes of disclosure and to establish a foundation as a basis for the claims herein which define the scope of the present invention.

Figure 1:
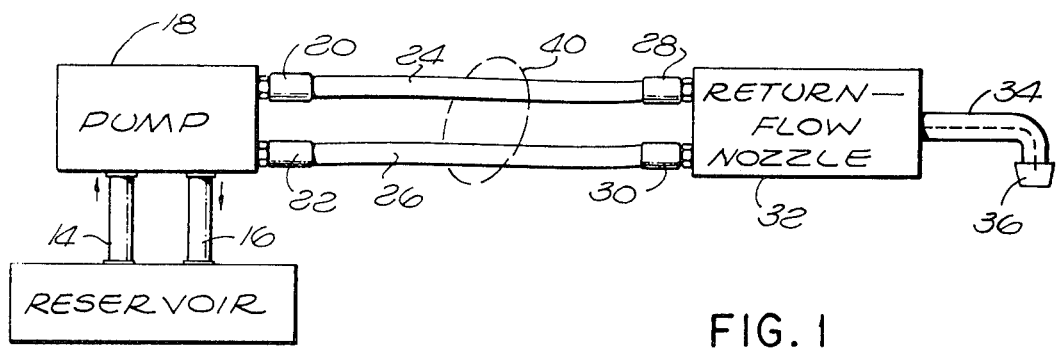
FIG. 1 is a diagrammatic representation of a system incorporating the present invention.

Referring initially to FIG. 1, a fuel reservoir 12 is represented with a pair of flow passages 14 and 16 (generally rigid) connected through a pump 18 to a pair of swivel couplings 20 and 22. The couplings 20 and 22 (disclosed in complete detail below) are in turn coupled to a pair of flexible hoses 24 and 26, which at their opposed ends are connected through couplings 28 and 30 (similar to the couplings 20 and 22) to a return flow nozzle 32 incorporating a dual-passage spout 34 terminated at a seal 36 for closed engagement with the fuel fill spout of an automobile.

In operation, the pump 18 draws liquid fuel from the reservoir 12 through the passage 14, dispensing the liquid fuel through the hose 24, the nozzle 32, and the spout 34. As the liquid gasoline enters the fuel tank of the automobile (not shown), the vaporous or gaseous fumes displaced in the automobile tank are accomodated passage back through the spout 34, the nozzle 32, and the hose 26 to flow through the passage 16 into the reservoir 12. Accordingly, the live hydrocarbon vapor or gaseous fumes are safely and economically utilized to fill the space remaining as fuel is drawn from the reservoir 12. Perhaps more importantly, the live hydrocarbons carried in the fumes are contained and contamination of the atmosphere is avoided.

In a closed system as represented in FIG. 1, it is important that the gaseous vapor passages (hose 26 with couplings 22 and 30) be adequate to accomodate low-pressure flow and furthermore that the passages are free of obstructions which might otherwise develop pressure irregularities and impede flow. It is also important that the hoses 24 and 26 be relatively flexible and accommodate movement for various positions of the return flow nozzle 32. Portions of the hoses 24 and 26 may be attached as symbolically represented by a loop 40. However, as a matter of convenience bordering upon practical necessity, it is important for the hoses 24 and 26 to be swivel connected to the pump 18 and the nozzle 32. In that regard, and in accordance with the present invention, the individual couplings 20, 22, 28, and 30 accommodate swivel motion and furthermore afford unobstructed flow passages with an economical and effective structural arrangement.

Figure 2:
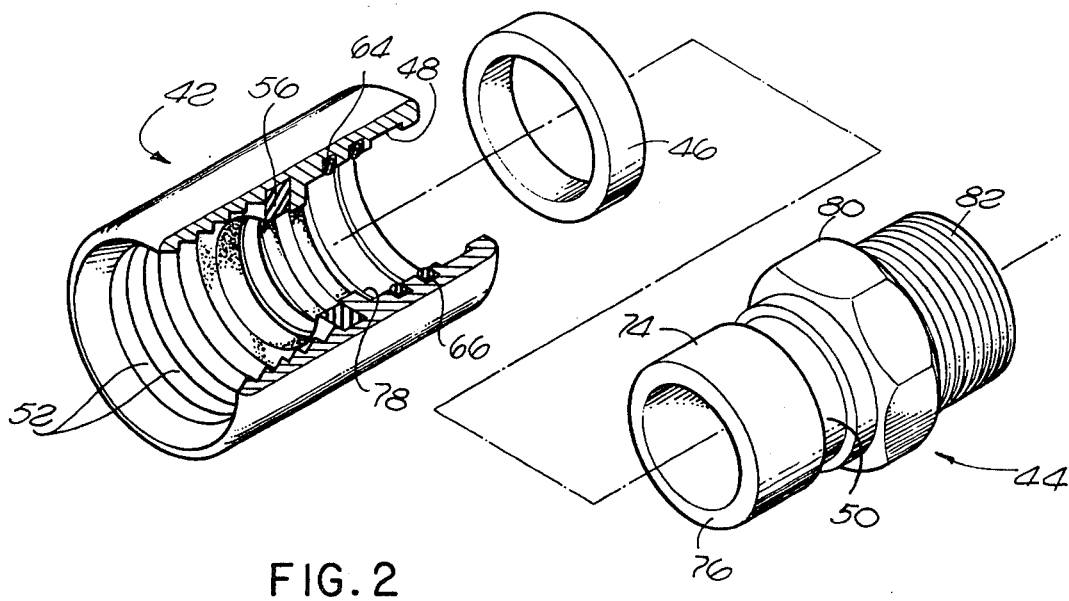
FIG. 2 is a partly exploded perspective view of components of the couplings provided in the system of FIG. 1.

Referring now to FIG. 2, a representative, detailed structure of the couplings 20, 22, 28, and 30 is illustrated. The couplings include two solid members, a hose connection component 42, and a component 44 for connection to a rigid member, e.g. nozzle or pump. Recognizing that various materials and designs may be employed, in one satisfactory form the component 42 is formed of an aluminum alloy while the component 44 comprises brass.

The component 44 is telescopically received in the component 42 with a nylon-like, somewhat-flexible flat ring 46 providing mechanical locking. Specifically, the ring 46 is fitted to engage both an internal groove 48 in the component 42 and an external groove 50 in the component 44. The ring 46 is sufficiently flexible to enable mating engagement of the components 42 and 44 with the ring 46 therebetween; however, once mated (FIG. 3) the components 42 and 44 are effectively locked together. The important considerations of the coupling include such effective locking in conjunction with the fact that the components are swivel mounted with respect to each other and provide a smooth internal passage of uniform diameter. Additionally, it is to be recognized that the coupling is simple, durable, and economical.

Considering the components 42 and 44 in somewhat greater detail, the component 42 is of generally cylindrical configuration and defines a plurality of internal sawtooth, annular ridges 52 for mechanical connection to a hose, e.g. hose 24 (FIG. 1). Specifically, referring to the assembled coupling of FIG. 3, the hose 24 is received in the ridges 52 with a pair of locking rings 54 therebetween. Such a mechanical engagement is supplemented by a rubber-like washer 56 to provide an effective fluid seal. It is to be noted that the interior of the hose is of substantially the same diameter as the interior of the joined coupling components 42 and 44. Consequently, no obstructions are offered to the flow of fluid.

Figure 3:
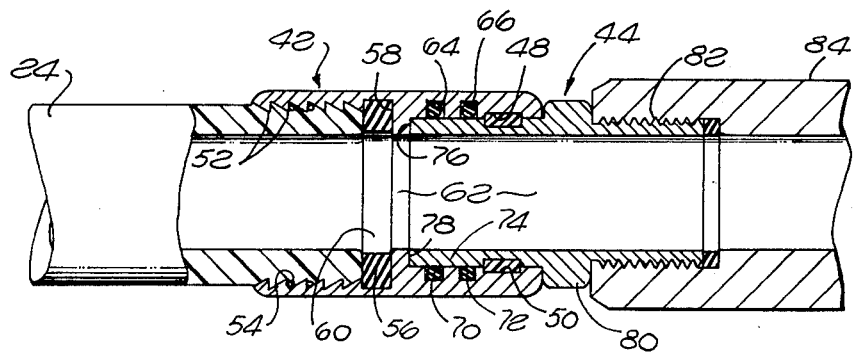
FIG. 3 is a vertical sectional view taken through an assembled coupling in accordance with the present invention.

To the right (as the coupling is depicted in FIGS. 2 and 3) of the ridges 52, the component 42 defines an annular shoulder 58 for supporting the washer 56. Within the shoulder a passage 60 is provided which extends into an open, somewhat-cylindrical space 62 (FIG. 3) which receives the ring 46 and a portion of the component 44. The space 62 defines three spaced-apart, concentric, internal grooves 64, 66, and 48. The grooves 64 and 66 receive O-rings 70 and 72 while the groove 48 receives the nylon-like locking ring 46. The O-rings 70 and 72 accomplish a rotary fluid seal while the nylon ring 46 accomplishes a mechanical lock.

The space 62 in the component 42 telescopically receives a cylindrical section 74 of the component 44 which includes the defined groove 50. The O-rings 70 and 72 dwell upon the cylindrical section 74 and are resiliently distorted to accomplish a fluid seal (FIG. 3). The ring 46 mates with the aligned grooves 48 and 50 for mechanical locking. Note that the end 76 of the component 44 abuts an internal shoulder 78 (FIG. 2) in the component 42.

The portion of the component 44 to the right of the cylindrical section 74 includes a hexagonal nut section 80 and a threaded section 82. The threaded section 82 is received in a rigid member 84 (FIG. 3) which may comprise either a nozzle or a pump.

Considering the manufacture and assembly of couplings in accordance with the present invention, the components 42 and 44 may be provided by castings which are machined to final shapes. The nylon-like ring 46 as well as the washer 56 and the O-rings 70 and 72 may comprise readily available flexible components. Upon the completion of each of the individual members, the O-rings 70 and 72 are placed in the grooves 64 and 66 and the washer 56 is seated against the shoulder 58. The nylon-like ring 46 is forced over the cylindrical section 74 of the component 44 to be seated in the groove 50. Next, as the final step in assembly, the component 44 is pressed into the component 42 to accomplish alignment of the grooves 48 and 50 with the nylon-like ring 46 therebetween. In such an assembled state, the coupling as depicted in FIG. 3 accommodates swivel motion between the components 42 and 44 yet offers no obstructions to flow therethrough.

In installing the couplings as depicted in FIG. 3 in a system as represented in FIG. 1, the threaded section 82 of the component 44 is matingly engaged with either the pump 18 (FIG. 1) or the nozzle 32. In that regard, the hexagonal section 80 may be useful with a wrench. At the opposed end of the coupling, a hose, e.g. hose 24, is received in the ridges 52 and abutting the washer 56 to accomplish a fluid seal. Consequently, the coupling affords swivel motion between the hose 24 and the rigid member 84 and additionally offers a smooth, clean passage between such members.

In view of the above, it may be seen that the system of the present invention affords an effective structure for the delivery of gasoline or other fuel without dispersing fumes into the atmosphere. It may also be appreciated that the system is economical, rugged and maintenance free in incorporating the couplings in accordance herewith. As indicated, the structure herein may be variously embodied to accomplish these and other desired funtions. Recognizing various modifications will be apparent, the scope hereof shall be deemed to be defined by the claims as set forth below.

What is claimed is:

1. A coupling for connecting a tank for receiving or dispensing fluid with a hose having a circular inner cross section comprising:

a first mating member adapted to be securely connected to the tank, said first mating member having an inner hollow portion having a uniform circular cross section with the inside diameter equal to the inside diameter of the hose and adapted to transmit fluid therethrough, said first mating member further having a circumferential recess on the outer surface thereof;

a ring of nylon like material adapted to be fitted in said circumferential recess of said first mating member; and a second mating member adapted to be rotatably coupled with said first mating member at one end with the hose at a second end, said second mating member including a circumferential recess on the inner surface thereof adapted to receive said ring to provide a rotatable mechanical coupling between said first mating member and said second mating member, said second mating member further including O-ring means mounted in grooves within the inner surface thereof for communicating with a portion of the outer surface of said first mating member to provide a fluid seal, said second mating member having a portion with an inner hollow surface for communicating with the fluid and having a circular inner cross sectional configuration which is identical to the circular cross sectional configuration of said inner hollow portion of said first mating member to provide an unobstructed flow path for fluid transmitted through said first and second mating members and the hose.

2. The coupling as described in claim 1 and wherein said portion of said second mating member having an inner hollow surface includes an inner hollow ring adapted for abutment against one end of said first mating member when said first and second mating members are coupled together and having an inside diameter equal to the inside diameter of said first mating member.

3. The coupling as described in claim 2 and further including a washer fitted against the inner surface of said second mating member and abutting against said hollow ring on one surface and abutting against the hose on another surface, said washer having an inside diameter equal to the inside diameter of said inner hollow portion of said first mating member and said inner hollow surface of said ring.

4. The coupling as described in claim 3 and wherein,
the first mating member has a portion of the outer surface thereof threaded to provide a screw connection to the tank, and
said second mating member has a plurality of circular protrusions on a portion of the inner surface thereof to grip the hose.

* * * * *